United States Patent
Eggink et al.

(10) Patent No.: US 9,491,256 B2
(45) Date of Patent: Nov. 8, 2016

(54) METHOD AND DEVICE FOR PERSONALIZING A MULTIMEDIA APPLICATION

(75) Inventors: Jana Eggink, Stuttgart (DE); Thomas Kemp, Esslingen (DE); Wilhelm Hagg, Korb (DE); Franck Giron, Waiblingen (DE); Javier Alonso Garcia, Stuttgart (DE)

(73) Assignee: Sony Corporation, Tokyo (JP)

( * ) Notice: Subject to any disclaimer, the term of this patent is extended or adjusted under 35 U.S.C. 154(b) by 955 days.

(21) Appl. No.: 12/340,085

(22) Filed: Dec. 19, 2008

(65) Prior Publication Data
US 2009/0228796 A1 Sep. 10, 2009

(30) Foreign Application Priority Data
Mar. 5, 2008 (EP) .................................... 08004088

(51) Int. Cl.
| | | |
|---|---|---|
| G06F 3/00 | (2006.01) | |
| G06F 3/048 | (2013.01) | |
| H04L 29/08 | (2006.01) | |
| H04N 21/258 | (2011.01) | |
| H04N 21/2668 | (2011.01) | |
| H04N 21/442 | (2011.01) | |
| H04N 21/45 | (2011.01) | |
| H04N 21/478 | (2011.01) | |
| H04N 21/658 | (2011.01) | |
| G06F 3/16 | (2006.01) | |

(52) U.S. Cl.
CPC ...... *H04L 67/306* (2013.01); *H04N 21/25891* (2013.01); *H04N 21/2668* (2013.01); *H04N 21/44222* (2013.01); *H04N 21/4532* (2013.01); *H04N 21/4781* (2013.01); *H04N 21/6582* (2013.01); *A63F 2300/8064* (2013.01)

(58) Field of Classification Search
USPC ....... 715/200, 700, 705, 706, 716, 719–722, 715/727–729, 747, 764, 789
See application file for complete search history.

(56) References Cited

U.S. PATENT DOCUMENTS 5,616,876 A * 4/1997 Cluts ............................... 84/609
5,676,138 A * 10/1997 Zawilinski ................... 600/301
5,740,388 A * 4/1998 Hunt .............................. 715/723

(Continued)

FOREIGN PATENT DOCUMENTS

| CN | 1643575 A | 7/2005 |
|---|---|---|
| CN | 1758248 A | 4/2006 |

(Continued)

OTHER PUBLICATIONS

Yamada et al, "Visual Text Reader for Virtual Image Communication on Networks", XP010233871, Multimedia Signal Processing, 1997, pp. 495-500., IEEE First Workshop on Princeton, NJ, Jun. 23, 1997.

(Continued)

*Primary Examiner* — Yongjia Pan
(74) *Attorney, Agent, or Firm* — Oblon, McClelland, Maier & Neustadt, L.L.P.

(57) ABSTRACT

A method for personalizing a multimedia application includes receiving, from a module of the multimedia application, a request for a multimedia output, wherein the request is of a type; providing user data of a user of the multimedia application, the user data being representative of a personal taste of the user; and determining a multimedia output depending on the type and the user data.

13 Claims, 6 Drawing Sheets

(56) References Cited

U.S. PATENT DOCUMENTS

| | | | |
|---|---|---|---|
| 5,801,687 A * | 9/1998 | Peterson et al. | 715/201 |
| 6,041,311 A * | 3/2000 | Chislenko et al. | 705/26.7 |
| 6,064,980 A * | 5/2000 | Jacobi et al. | 705/26.7 |
| 6,199,034 B1 * | 3/2001 | Wical | 704/9 |
| 6,336,219 B1 * | 1/2002 | Nathan | 725/91 |
| 6,370,513 B1 * | 4/2002 | Kolawa et al. | 705/7.33 |
| 6,506,969 B1 * | 1/2003 | Baron | 84/609 |
| 6,539,395 B1 * | 3/2003 | Gjerdingen et al. | |
| 6,623,427 B2 * | 9/2003 | Mandigo | G11B 19/02 600/300 |
| 6,795,808 B1 * | 9/2004 | Strubbe et al. | 704/275 |
| 6,938,209 B2 * | 8/2005 | Ogawa et al. | 715/727 |
| 6,964,023 B2 * | 11/2005 | Maes et al. | 715/811 |
| 6,987,221 B2 * | 1/2006 | Platt | 84/601 |
| 7,024,424 B1 * | 4/2006 | Platt et al. | |
| 7,102,067 B2 * | 9/2006 | Gang et al. | 84/600 |
| 7,181,297 B1 * | 2/2007 | Pluvinage et al. | 700/94 |
| 7,181,691 B2 * | 2/2007 | Sezan et al. | 715/719 |
| 7,193,635 B2 * | 3/2007 | Ueda | 345/629 |
| 7,208,669 B2 * | 4/2007 | Wells | A63F 13/12 463/35 |
| 7,325,043 B1 * | 1/2008 | Rosenberg et al. | 709/219 |
| 7,328,272 B2 * | 2/2008 | Kuramochi et al. | 709/231 |
| 7,424,677 B2 * | 9/2008 | Sezan et al. | 715/719 |
| 7,460,761 B2 * | 12/2008 | Inoue et al. | 386/248 |
| 7,509,580 B2 * | 3/2009 | Sezan et al. | 715/719 |
| 7,693,535 B2 * | 4/2010 | Dunko | 455/518 |
| 7,698,238 B2 * | 4/2010 | Barletta | G06F 3/011 463/36 |
| 7,711,838 B1 * | 5/2010 | Boulter et al. | 709/231 |
| 7,716,572 B2 * | 5/2010 | Beauregard et al. | 715/223 |
| 7,739,723 B2 * | 6/2010 | Rogers et al. | 726/2 |
| 7,764,311 B2 * | 7/2010 | Bill | 348/222.1 |
| 7,840,620 B2 * | 11/2010 | Vignoli et al. | 707/705 |
| 7,877,676 B2 * | 1/2011 | Munetsugu et al. | 715/204 |
| 7,890,374 B1 * | 2/2011 | Khan et al. | 705/26.63 |
| 7,890,623 B2 * | 2/2011 | Bates et al. | 709/224 |
| 7,912,720 B1 * | 3/2011 | Hakkani-Tur et al. | 704/270 |
| 7,921,369 B2 * | 4/2011 | Bill | 715/753 |
| 7,958,119 B2 * | 6/2011 | Eggink et al. | 707/732 |
| 7,985,911 B2 * | 7/2011 | Oppenheimer | 84/600 |
| 8,017,852 B2 * | 9/2011 | Yamashita et al. | 84/615 |
| 8,020,104 B2 * | 9/2011 | Robarts et al. | 715/744 |
| 8,060,224 B2 * | 11/2011 | Itami et al. | 700/90 |
| 8,074,253 B1 * | 12/2011 | Nathan | 725/139 |
| 8,156,435 B2 * | 4/2012 | Wohlert | 715/716 |
| 8,161,039 B2 * | 4/2012 | Nielen | G06F 17/30749 707/723 |
| 8,229,935 B2 * | 7/2012 | Lee et al. | 707/754 |
| 8,230,099 B2 * | 7/2012 | Weel | 709/231 |
| 8,271,111 B2 * | 9/2012 | Makino | 700/94 |
| 8,290,341 B2 * | 10/2012 | Hirata et al. | 386/248 |
| 8,327,266 B2 * | 12/2012 | Svendsen | 715/716 |
| 8,346,798 B2 * | 1/2013 | Spiegelman et al. | 707/770 |
| 8,352,331 B2 * | 1/2013 | Dunning et al. | 705/26.7 |
| 8,429,533 B2 * | 4/2013 | Craine | G06F 13/10 715/723 |
| 8,583,615 B2 * | 11/2013 | White et al. | 707/705 |
| 8,776,149 B1 * | 7/2014 | Koch | H04N 21/4334 725/37 |
| 2002/0082901 A1 * | 6/2002 | Dunning et al. | 705/10 |
| 2002/0138630 A1 * | 9/2002 | Solomon et al. | 709/228 |
| 2002/0147048 A1 * | 10/2002 | Takatsuka et al. | 463/42 |
| 2003/0060728 A1 * | 3/2003 | Mandigo | 600/545 |
| 2003/0089218 A1 * | 5/2003 | Gang et al. | 84/615 |
| 2003/0131715 A1 * | 7/2003 | Georges | 84/609 |
| 2003/0191816 A1 * | 10/2003 | Landress et al. | 709/219 |
| 2003/0229537 A1 * | 12/2003 | Dunning et al. | 705/10 |
| 2003/0236582 A1 * | 12/2003 | Zamir et al. | 700/94 |
| 2004/0004631 A1 * | 1/2004 | Debique et al. | 345/704 |
| 2004/0153970 A1 * | 8/2004 | Shinoda et al. | 715/517 |
| 2004/0254957 A1 * | 12/2004 | Hyotyniemi et al. | 707/104.1 |
| 2005/0095569 A1 * | 5/2005 | Franklin | 434/350 |
| 2005/0103186 A1 * | 5/2005 | Ueoka | 84/601 |
| 2005/0211071 A1 * | 9/2005 | Lu et al. | 84/611 |
| 2005/0250996 A1 * | 11/2005 | Shirai et al. | 600/301 |
| 2006/0054007 A1 * | 3/2006 | Lu et al. | 84/611 |
| 2006/0111621 A1 * | 5/2006 | Coppi et al. | 600/300 |
| 2006/0122834 A1 * | 6/2006 | Bennett | 704/256 |
| 2006/0126452 A1 * | 6/2006 | Yamashita et al. | 369/30.23 |
| 2006/0143647 A1 * | 6/2006 | Bill | 725/10 |
| 2006/0170945 A1 * | 8/2006 | Bill | 358/1.13 |
| 2006/0204937 A1 * | 9/2006 | Grignon | 434/236 |
| 2006/0254411 A1 * | 11/2006 | Alcalde et al. | 84/608 |
| 2006/0259355 A1 * | 11/2006 | Farouki et al. | 705/14 |
| 2007/0066916 A1 * | 3/2007 | Lemos | 600/558 |
| 2007/0157795 A1 * | 7/2007 | Hung | 84/600 |
| 2007/0275736 A1 * | 11/2007 | Baek et al. | 455/457 |
| 2008/0189319 A1 * | 8/2008 | Nielen | G06F 17/30749 |
| 2009/0055759 A1 * | 2/2009 | Svendsen | 715/764 |
| 2009/0063414 A1 * | 3/2009 | White et al. | 707/3 |
| 2009/0083116 A1 * | 3/2009 | Svendsen | 705/10 |
| 2009/0172146 A1 * | 7/2009 | Bates et al. | 709/224 |
| 2009/0172538 A1 * | 7/2009 | Bates et al. | 715/706 |
| 2009/0228796 A1 * | 9/2009 | Eggink et al. | 715/716 |
| 2009/0254836 A1 * | 10/2009 | Bajrach | 715/745 |
| 2010/0018382 A1 * | 1/2010 | Feeney et al. | 84/615 |

FOREIGN PATENT DOCUMENTS

| | | |
|---|---|---|
| EP | 1 647 903 A1 | 4/2006 |
| WO | WO 03/073417 A2 | 9/2003 |
| WO | WO 03/104940 A2 | 12/2003 |
| WO | WO 2007/002448 A1 | 1/2007 |
| WO | WO 2007/072019 A2 | 6/2007 |

OTHER PUBLICATIONS

U.S. Appl. No. 12/593,927, filed Sep. 30, 2009, Kemp.
U.S. Appl. No. 12/369,352, filed Feb. 11, 2009, Kemp.
Chinese Office Action issued Nov. 28, 2012, in China Patent Application 200910126175.6 (with English translation).
Office Action issued Apr. 1, 2014 in Chinese Patent Application No. 200910126175.6 (submitting English language translation only).

* cited by examiner

METHOD AND DEVICE FOR PERSONALIZING A MULTIMEDIA APPLICATION

An embodiment of the invention relates to a method for personalizing a multimedia application. Further embodiments relate to a device and system based on a personalized multimedia application.

BACKGROUND

Nowadays, a multitude of multimedia applications is available for users, e.g. by accessing web pages or computer games via internet or by buying software such as office applications in online or real-world stores.

In order to enhance user satisfaction, the multimedia applications should be personalizable.

It is, therefore, an object of the invention to provide a method for personalizing a multimedia application.

This object is solved by a method and device as claimed herein and by a computer readable medium as claimed herein.

Further objects and possible advantages of the invention will become apparent from consideration of the drawings and the ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain the principles of the embodiments. Other embodiments and many of the intended advantages of embodiments will be readily appreciated as they become better understood by reference to the following detailed description.

The elements of the drawings are not necessarily to scale relative to each other. Like reference numerals designate corresponding similar parts.

DETAILED DESCRIPTION

In the following, embodiments of the invention are described. It is important to note, that all embodiments described in the following may be combined in any way, i.e. there is no limitation that certain described embodiments may be not be combined with others.

It is further to be noted that other embodiments may be utilized and structural and logical changes may be made without departing from the scope of the present invention. The following detailed description, therefore, is not to be taken in a limiting sense, and the scope of the present invention is defined by the appended claims.

It is further to be understood that the features of the various embodiments described herein may be combined with each other, unless specifically noted otherwise.

Figure 1:
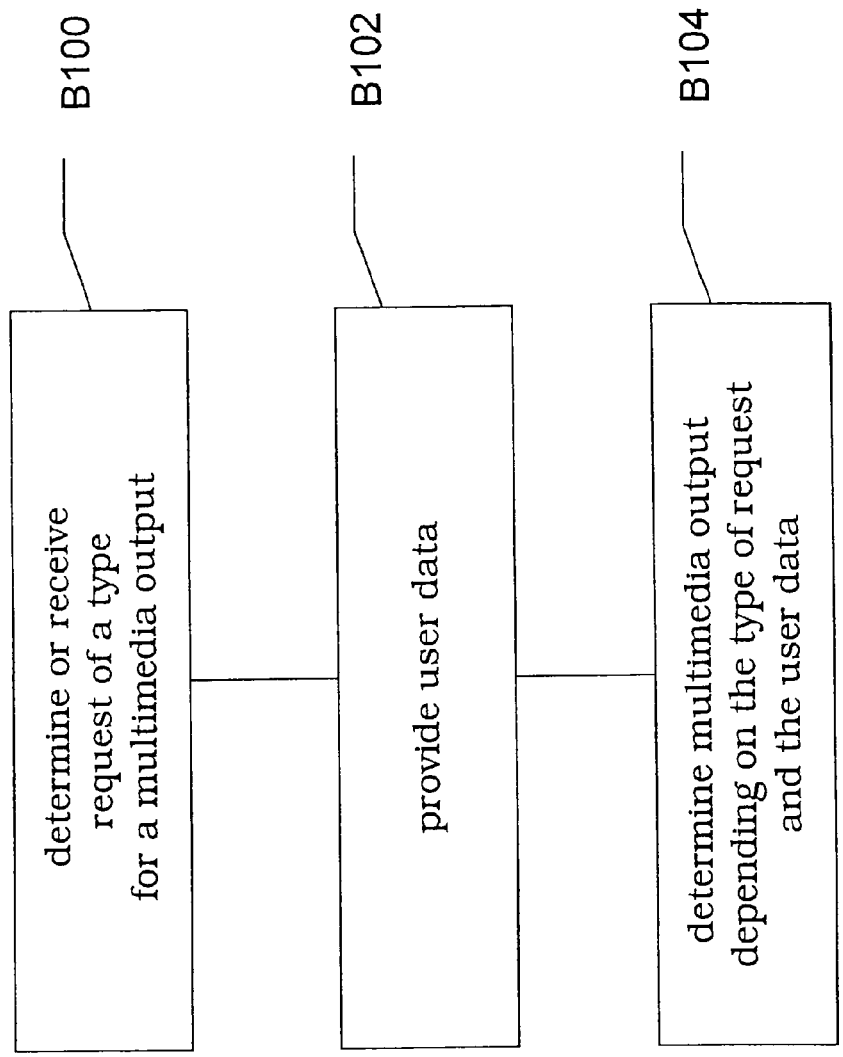
FIG. 1 is a block diagram illustrating one embodiment of a method for personalizing a multimedia application.

FIG. 1 is a block diagram illustrating one embodiment of a method for personalizing a multimedia application. At B100, a request for multimedia output can be received. The request may have been generated by a module of the multimedia application, and may further be of a type.

At B102, user data referring or belonging to a user of the multimedia application may be provided. The user data may, for example, be representative of a personal taste of the user.

Block B104 illustrates a determination of a multimedia output. The determination may be carried out depending on the type of request received in B100 and on the user data provided in B102.

The multimedia application may be an arbitrary application running on an electronic device supporting an exchange of multimedia signals between a user and the application. It may, for example, be a web page browsed via internet or via a local network. It may also be a computer game that may be stored locally on a user's computer or that may be accessed via a network such as the internet. Such a game may allow conjoined gaming of several users in the network. It is further possible that the multimedia application includes office applications, data bases, programs for editing or accessing multimedia files, programming environments, or the like.

As becomes clear from the above, the multimedia application may be run on a user's device or may be accessed remotely via a network.

Its content may be provided by a content provider, i.e. a group, business, organization, or individual that provides web pages, entertainment, or documents, via a network or on a storage media.

The multimedia application may include several modules interacting with each other. One of the modules, that may for example be responsible for supporting user interaction on a human-machine-interface, may send a request for a multimedia output, the request having a respective type. Since the request may arise from a situation occurring in the multimedia application, the type of the request may depend on the situation, or on a state and/or an event occurring in the multimedia application.

If, for example, the user plays a computer game, he or she may have reached a high score. The type of request for multimedia output may in this case refer to the high score, to congratulations or the like. The situation may be indicated to the user for example by playing a happy song, by transmitting congratulations via an appropriate piece of music, by showing a suitable picture, for example a bottle of champagne, and/or by displaying a corresponding video, for example showing a display of firework.

If, in another situation, the user enters a dangerous situation, a request for multimedia output may be generated, this time being of a type referring to danger. The situation may then be accompanied by a suitable piece of music intensifying excitement.

If, in a yet another situation, the user has been able to escape from a dangerous situation, this may result in a request for multimedia output, the type referring to relaxation, safety and/or security. The situation may then be accompanied by relaxed music, pictures or videos.

If, in another example, the user is visiting a web site, situations may for example depend on the site being selected, on an input given by the user, or on the position of a mouse pointer or cursor when the user intends to select different links. By displaying adequate multimedia outputs, a content that will be selected may be illustrated to the user, for example by displaying adequate pictures or videos near the mouse pointer, or by playing suitable songs or music jingles. For example, when pointing to a link leading to the online travel agency, the mouse pointer may be highlighted with a suitable graphic, such as, for example, a picture of the pyramids or of a sunset at seaside. In this case, the type of the request may refer to travelling. If, for a different selection, the user points to the music store, another request may be generated, this time with its type referring to music. The cursor may consequently change and display a running turntable or the like. After having entered the music store, further links leading to offers of different musical styles may be characterized by suitable audio examples that may, for example, be played when the user points to the link.

If, in another example, the multimedia application is an office program, multimedia outputs may support the usability of the application. For example, a successful user interaction such as saving or opening an item may be accompanied by a suitable multimedia output. If a user interaction has been unsuccessful, this may also be indicated by a corresponding multimedia output.

If the multimedia application is realized on the basis of states and/or events, for example using an underlying state machine, a present state or an occurring event may have influence on the generation of the request, and the type of the request may then depend on the state or event, respectively.

In a game of chess, for example, a state may be described by a specific position of the chessmen, and an event occurs when one of the users places a chessman at a different position. Such states or events may then be accompanied by suitable music. For example, danger may be expressed if one of the users has been checkmated.

As described in the above, the type of request may indicate a meaning, feeling and/or emotion. The meaning may be related to the situation occurring in the multimedia application and may, for example, reflect its consequences, purpose, or significance for the user. Feelings or emotions, describing states of consciousness, emotional perceptions and/or attitudes, may also be indicated by the type. In this case, the multimedia output may be supposed to transport the meaning, feeling and/or emotion to the user.

The meaning, feeling and/or emotion may be negative or positive, e.g. may have a negative or a positive connotation for the user, resulting in a more or less optimistic or confident state of mind. The meaning, for example, may be selected from a group including success, failure, gain, loss, danger or security. The feeling may be selected from a group including calm, dramatic, relaxed, excited, happy, depressed, proud, timid and expected feelings. The emotion may be selected from a group including joy, sorrow, fear, hate or the like.

In B102, user data may be provided for the user of the multimedia application. The user data may be representative of a personal taste of the user. This personal taste may, for example, depend on the user's personal attitude, reaction or aesthetic perception toward esthetic phenomena, which may be regarded as being either good or bad.

Concerning music, a personal taste of the user may indicate one or more musical styles the user likes or dislikes. For example, one user might only like certain styles of music, i.e. trance or techno, but hate pop and jazz music. However, the preferences of another user may be the other way around. Further users may only like classical music.

A user's taste may also have influence on pictures and videos he or she likes or dislikes. For example, one user may highly appreciate photographic views of landscapes or nature, while another user prefers comic strips.

The personal taste of the user may be evaluated with different approaches.

For example, it is possible to evaluate data from a user profile. Here, personal characteristics of the user may be described, such as gender, age, nationality, profession, or the like. These personal characteristics may have an influence on personal taste, since it is clear that the personal taste of a twelve year old German girl, a Japanese student in the early twenties or a middle-aged American house-wife may defer. For example, one can guess that the German girl may be fond of Barbie videos, the Japanese student may like Japanese comic strips and that the American housewife may be enchanted by popular songs of the American charts.

The user profile may further include data being descriptive of the personal taste of the user. For example, information may be included indicating what kind of music the user likes to listen to, what kind of films he is interested in or the like. This kind of information may have been determined by observing the users behavior, for example when he or she listens to music, watches films, visits web sites or downloads multimedia data. Alternatively or in addition, the information included in the user profile may have been stated explicitly by the user, e.g. by using a questionnaire.

In B104, the multimedia output is determined depending on the type of the request and on the user data.

For example, the multimedia output may be determined in accordance with the type and the user data. In this case, the multimedia output may on the one hand be chosen such that it corresponds to an occurring situation, state or event. It may, for example, be intended to transmit a meaning, feeling and/or emotion in accordance with the situation. On the other hand, the multimedia output may be chosen such that it corresponds to the user's personal taste. This allows a successful transport of the meaning, feeling and/or emotion to the user since a multimedia output in accordance with his or her taste is more likely to influence his or her perception.

This allows a personalization of the multimedia application fitting both, the intensions of the content provider and the taste of the user. As a consequence, the user may like the multimedia outputs and enjoys usage of the multimedia application.

For example, when the user reaches a high score in a computer game that may be personalized, as multimedia output a happy and energetic song of one of the user's favorite pop groups may be chosen. Feelings like danger or relaxation related to a situation occurring in the computer game may also be transported by a song of one of the user's favorite interprets.

If, in another example, the user is visiting a personalized web site of an online travel agency, the different destinations may be illustrated with pictures or videos in accordance with his or her taste, e.g. with photos of landscapes and wild animals for a user who is fond of nature, of restaurants, wine yards and market places for a user who is connoisseur of fine food and drink, or of museums or historic sites for a user interested in history. Further, the underlying music may be selected in accordance with the content of the web site and with the user's taste, for example by selecting folkloristic music or pop music originating from a destination country, selected in accordance with the user's age.

A personalized office application may, as a further example, use audio and video output in accordance with the user's taste to support him or her when using the application. For example, helping hints may be presented by a "Barbie"-doll when a young German girl is using the application, but by a comic monster when a Japanese student is the user. Jingles indicating success or failure of a user interaction may be adapted in sound to the musical taste of the user, for example by using pop, jazz or classical synthesizer sounds.

The multimedia output may, inter alia, include audio data and/or video data and may consequently produce personalized sound effects and/or personalized visual effects to the user when rendered. The sound effects and/or visual effects may transport the meaning, feeling and/or emotion to the user. The meaning, feeling and/or emotion may hence be illustrated by suitable pictures, videos and/or songs that may indicate the meaning, feeling and/or emotion to the user in a very direct way. This is due to the fact that sound or visual effects are intuitive, such that the user can recognize the meaning, feeling and/or emotion. In other words, the multimedia output assures by its sound and/or visual effects an audio and/or video feedback for a situation occurring in the multimedia application. Given that the multimedia output is determined in accordance with the user's personal taste, this ensures a close involvement of the user into the situation in the multimedia application, establishing a close emotional binding.

In block B104, the determination of the multimedia output on the basis of the type of request and the user data may comprise evaluating meta-data of multimedia items comprised within a multimedia collection. The multimedia output is then determined based on the multimedia items of the collection. This determination may comprise selecting at least one multimedia item, selecting a section of the at least one multimedia item and/or preprocessing the section for example by applying a fading or the like.

If determining the multimedia output comprises evaluating meta-data of multimedia items comprised within the multimedia collection, the meta-data may be descriptive of the meaning, feeling and/or emotion that are to be transported by a respective multimedia item. It may, for example, be indicated by the meta-data of a respective multimedia item that the multimedia item has a specific emotional connotation, which might be negative or positive as, for example, happiness or sadness. Further feelings may be transferred, such as calm, relaxation, excitation, or the like. Alternatively or in addition, a meaning of the multimedia item may be indicated in the meta-data, such as congratulations, success, failure, danger or the like. In this case, it is to be supposed that, when rendering a multimedia output determined on the basis of a respective multimedia item with a specific connotation, that its meaning, feeling and/or emotion will be transported to the user.

Consequently, the multimedia output may be determined on the basis of a multimedia item such that its respective meta-data matches the type of the request. For example, the multimedia output may be determined such that its respective meta-data optimally fits of the type.

It is further possible that the meta-data of a multimedia item comprised within the multimedia collection indicates, for example, a musical style, an interpreter, a composer and/or an author of the multimedia item. In this case, the multimedia output may be determined on the basis of a multimedia item that matches the personal taste of the user. It is, for example, possible to select one of the multimedia items such that its respective meta-data optimally fits the personal taste of the user.

It is further possible to select one of the multimedia items in view of both criteria, i.e. such that its respective meta-data matches on the one hand the type of the request and on the other hand the personal taste of the user. In this case, it is possible to select a multimedia output that is suitable for a situation occurring in the multimedia application and that pleases the user.

The meta-data used as a basis for a selection of one of the multimedia items may at least partially be comprised within the multimedia collection. Alternatively or in addition, it is possible that at least parts of the meta-data are requested and received from a remote server, for example from the content provider of the multimedia application or from a large music database that may be accessed via network. The meta-data can either be hand-annotated or computed automatically.

Figure 2:
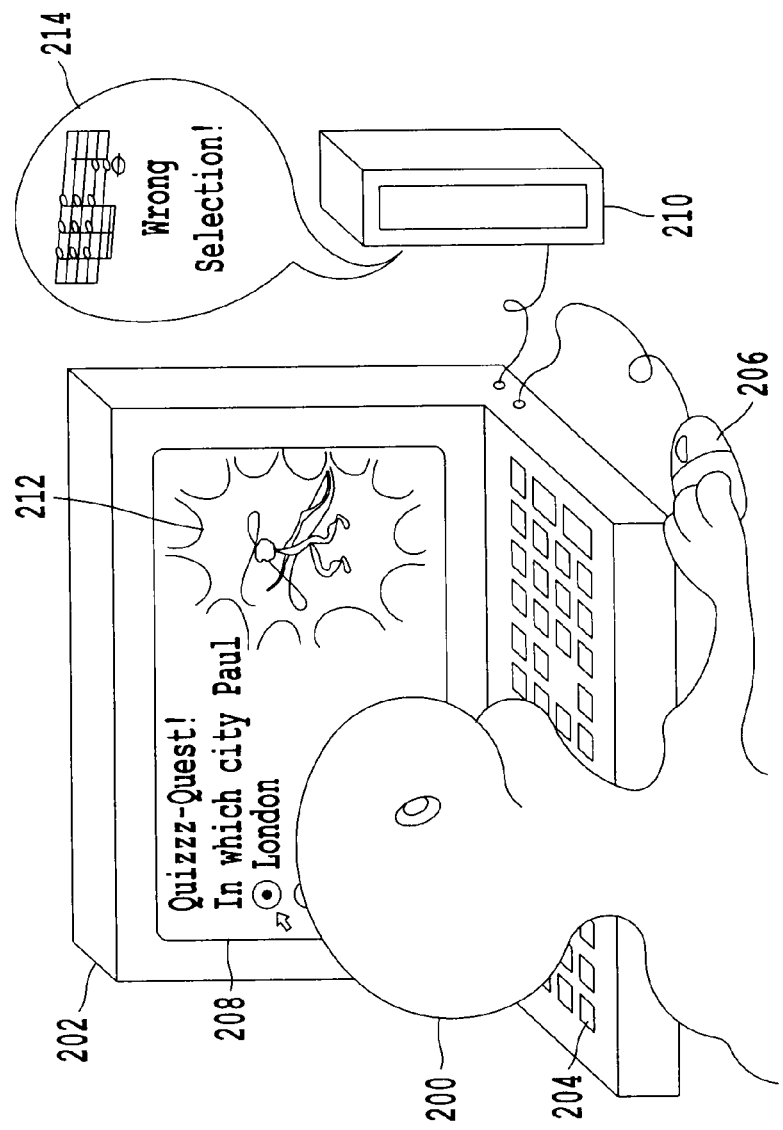
FIG. 2 is a diagram illustrating one embodiment of a device for personalizing a multimedia application.

FIG. 2 illustrates an embodiment of a device for personalizing a multimedia application. A user 200 is using the device 202 for playing a computer game (multimedia application). Device 202 includes several unit for user interaction, such as a key input unit 204, a computer mouse 206, a screen 208 and an audio output unit realized as a loudspeaker 210. Further, device 202 may include a data processor configured to execute the multimedia application used by user 200.

In FIG. 2, a situation is depicted in which the user answers questions of a computer quiz, selecting one of several possible answers by a click of computer mouse 206. Upon this selection, the quiz application generates a request for a multimedia output with the purpose of informing the user if his or her answer is correct. In the case depicted, the selection has been wrong. As a consequence, the type of request may indicate failure.

In the case depicted in FIG. 2, device 202 includes a storage configured to store user data being representative of the personal taste of user 200. The user data may include a collection of video films and/or a song collection from which the personal taste of user 200 may be derived. In the case depicted, it is known from the collection of films that user 200 is very font of "Zorro".

The multimedia output, in FIG. 2 including a video output displayed on a part of screen 208 and an audio output played to user 200 via loudspeaker 210 is determined depending on the type of the request and of the personal taste of the user. Consequently, video output 212 shows a small "Zorro"-figure brandishing his sword in an aggressive way, while a corresponding piece of music and a voice output informs user 200 about his or her wrong selection. The "Zorro"-figure and the piece of music 214 may have been determined from a multimedia collection of the content provider of the quiz, or may have been derived from the user's video collection.

User 200, getting direct audio and video feedback 212, 214 for his selections in accordance with his or her taste, may be pleased to use this multimedia computer game.

Figure 3:
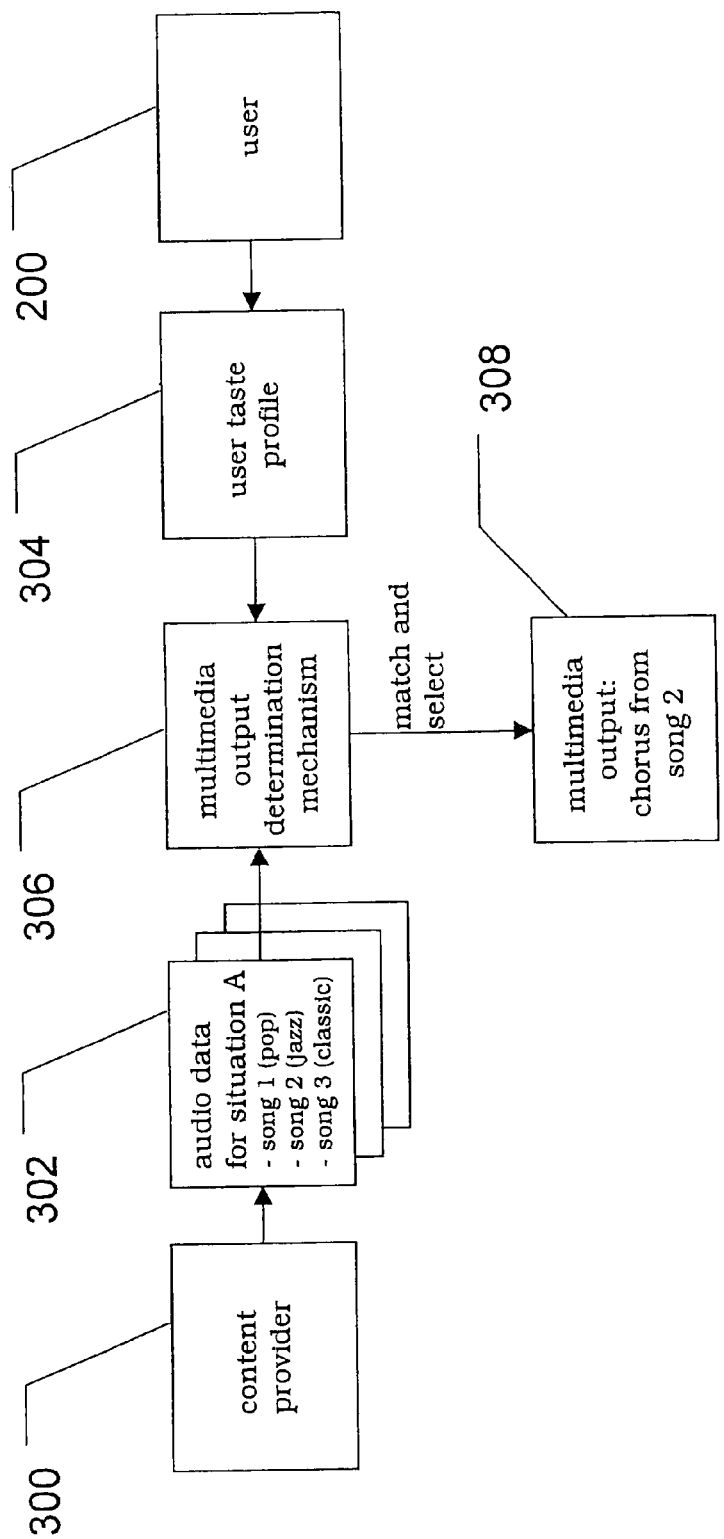
FIG. 3 illustrates a further embodiment of the method.

FIG. 3 shows a further embodiment wherein the multimedia output is determined from a multimedia collection provided by the content provider 300 of the multimedia application in accordance with the personal taste of user 200.

As illustrated, content provider 300 may provide a provider collection 302 including a range of different audio examples that he thinks are appropriate for situations occurring in the multimedia application. As an example, for situation A song 1 being a pop song, song 2 being a piece of jazz and song 3 being a piece of classical music are provided. All songs are supposed to be a suitable output in situation A. Accordingly, on the occurrence of situation A, a request for a multimedia output of a type referring to situation A may be generated. The type referring to situation A may be related to the meaning of the situation for the user, or to a feeling or emotion that may be appropriate in this situation.

On the other hand, a user taste profile 304 is provided, describing musical preferences of user 200. The profile may have been obtained indirectly by observing the user's behavior or by having user 200 state his preferences explicitly, e.g. by filling a questionnaire.

Upon a request of the multimedia application, a multimedia output determination mechanism 306 may carry out a match between the audio examples provided in provider collection 302 by content provider 300 and the user taste profile 304. That is, for a situation occurring in the multimedia application, one of the appropriate songs provided by content provider 300 is chosen depending on user taste profile 304. This match may be carried out with respect to meta-data describing properties of the songs. The best matching audio example may accordingly be selected as multimedia output 308 and will then be played to the user.

Figure 4:
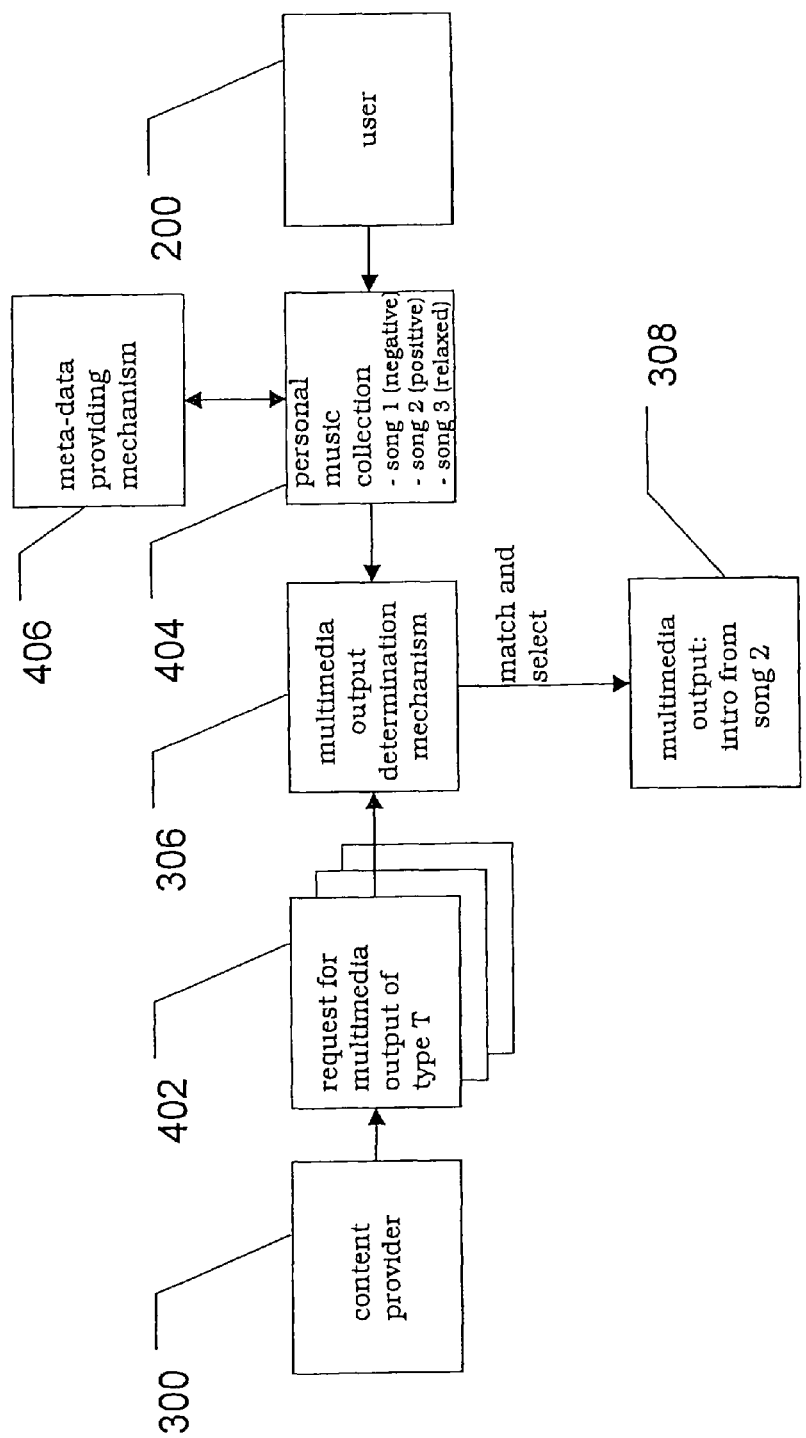
FIG. 4 illustrates yet a further embodiment of the method.

FIG. 4 illustrates an embodiment where a content provider 300 provides requests for a multimedia output 402, one of them being of a type T. User 200 has a personal music collection 404 including songs 1, 2 and 3.

In this embodiment, the songs included in personal music collection 404 may be annotated with meta-data expressing the meaning, feeling and/or emotion that may be transported when the songs are played to user 200. In FIG. 4, song 1 is supposed to have a negative connotation, song 2 to have a positive connotation and song 3 to express a relaxed feeling. The corresponding meta-data may have been provided by a meta-data providing mechanism 406, for example by using signal processing based methods or by requesting the meta-data from a local storage or a remote server.

If request 402 for multimedia output occurs in the multimedia application, multimedia output determination mechanism 306 may select the piece of music from personal music collection 404 that best matches the intention of content provider 300. After carrying out the match, multimedia output 308 may be determined on the basis of the piece of music selected and may be rendered to user 200.

Figure 5:
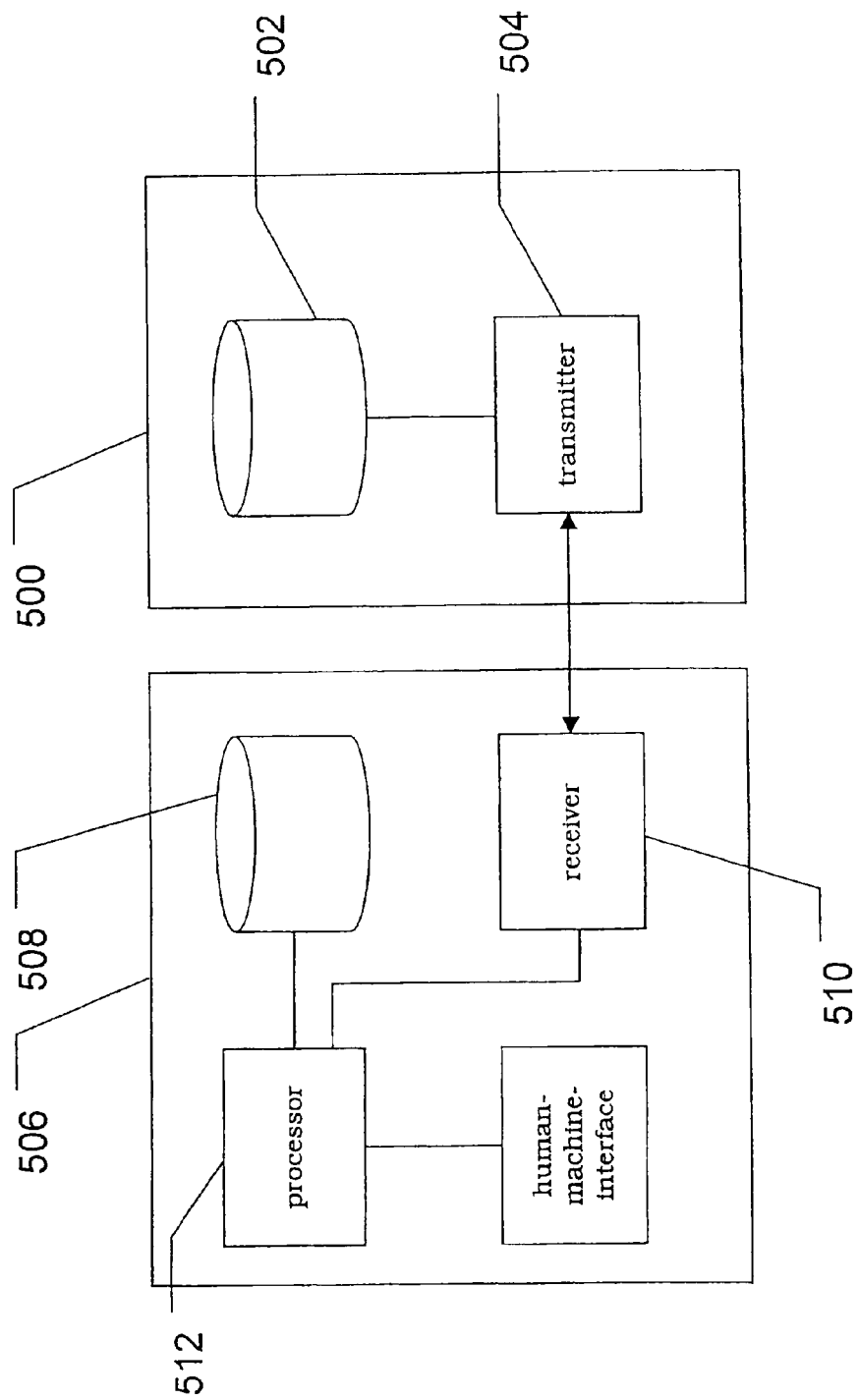
FIG. 5 illustrates an embodiment of a system for personalizing a multimedia application.

In FIG. 5, an embodiment of a system for personalizing a multimedia application is illustrated.

The system includes a server 500 including a storage 502 in which content items such as pieces of music, video films and/or pictures may be stored. Further, a transmitter 504 for transmitting content items is included.

Further, the system includes a client 506. Client 506 includes a storage 508 in which user data may be stored. The user data may be representative of a personal taste of user 200 and may include user taste profile 302 as well the user's personal music collection 404. Further, client 506 includes a receiver 510 for receiving the con-tent items from server 500. Receiver 510 consequently allows additional access to the content items stored in storage 502 of server 500.

A processor 512, executing the multimedia application, may access the user data and the content items stored in storage 508 of client 506 and storage 502 of server 500. On executing the multimedia application, processor 512 may generate request 402 for multimedia output 308. Processor 512 may now determine multimedia output 308 depending on the type of request 402, on the user data and on the content items. The resulting multimedia output 308 may consequently be suitable for the type while at the same time fitting user taste profile 304. It may be chosen from content items included in storage 508 of client 506 and/or included in storage 502 of server 500. The multimedia output 308 may then be rendered to user 200.

Figure 6:
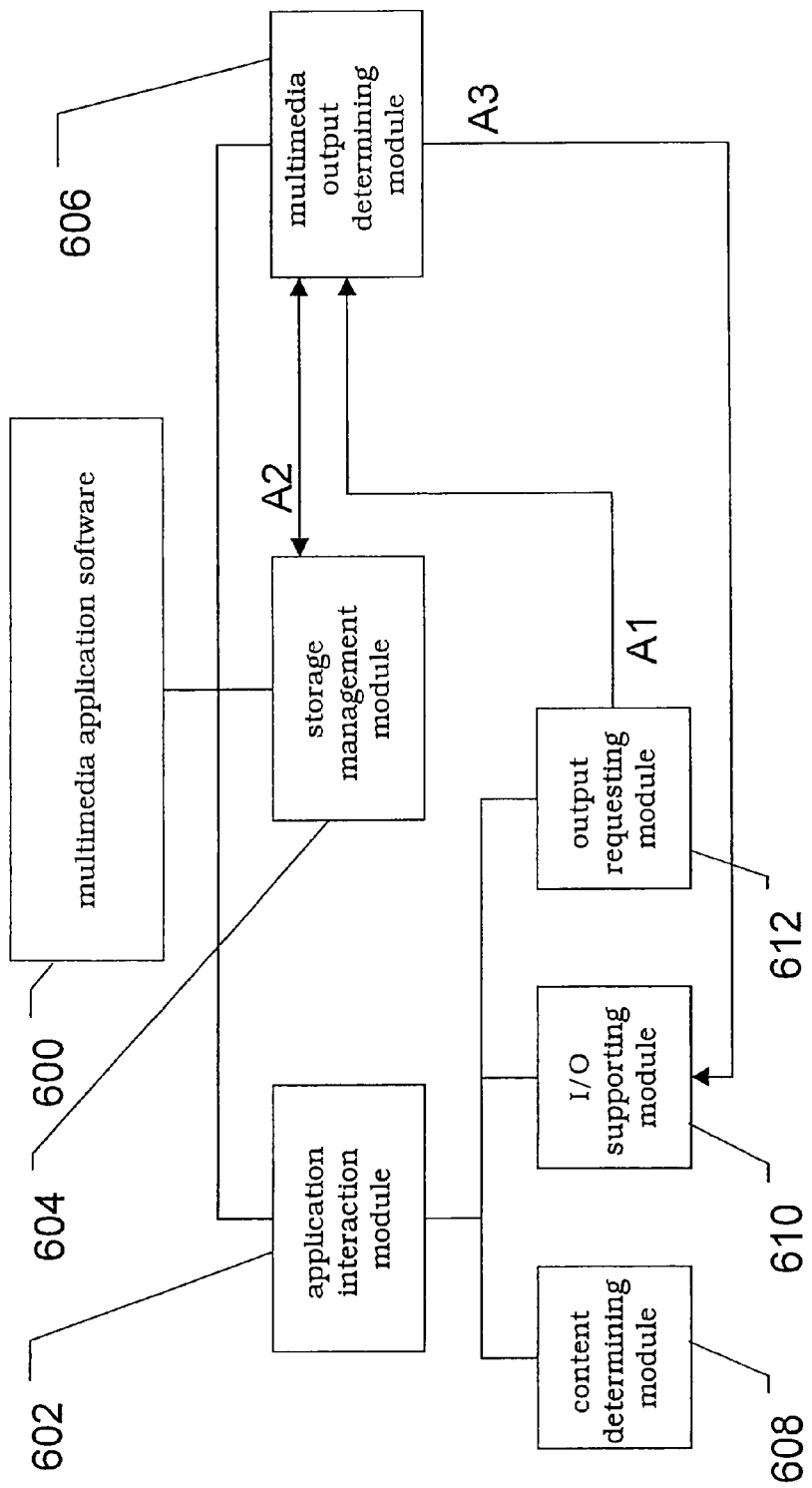
FIG. 6 illustrates the internal structure of a multimedia application configured to be personalized.

FIG. 6 illustrates a possible structure of a multimedia application software 600 including, inter alia, an application interaction module 602, a storage management module 604 and a multimedia output determining module 606. Application interaction module 602 may be divided into a content determining module 608, determining the content of the multimedia application to be rendered to user 200, an I/O supporting module 610, supporting human-machine-interaction, and an output requesting module 612, that may, depending on the situation, the state or the event occurring in the multimedia application, send request 402 for multimedia output 308 to multimedia output determining module 606 as indicated by arrow A1.

This request may then be received by multimedia output determining module 606. For determining the multimedia output in accordance with the type of request 402 and the user data, multimedia output determining module 606 may access a suitable multimedia item by calling storage management module 604, as indicated by arrow A2.

Storage management module 604 may provide access to the user data of user 200. This user data is supposed to be representative of the personal taste of user 200 and may include his or her personal music collection 404 as well as user taste profile 304.

Multimedia output determining module 606 may then determine multimedia output 308 depending on the type of request 402 and on the user data. Multimedia output 308 may then be sent to I/O supporting module 610 as indicated by arrow A3. I/O supporting module 610 may accordingly render multimedia output 308 to user 200.

Multimedia application software 600 may be stored on a computer readable medium. For this, computer program instructions that course a computer to execute a method for personalizing a multimedia application as described in the above may be stored on the computer readable medium.

While the specific embodiments described herein substantially focus on multimedia applications such as computer games or web pages, the present invention can be applied to any application in which human-machine-interaction may be supported by multimedia outputs.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A content providing apparatus connected to a client device over a communication network, the content providing apparatus comprising:

circuitry that receives a request for multimedia output from the client device over the communication network, the request being for multimedia output indicating a meaning corresponding to an event occurring within a multimedia application of the client device, the multimedia application being executed by a user of the client device and including a gaming application, the event being a result occurring in the execution by the user of the multimedia application, the result including at least one of a high or low score, win or loss, and failure or success, and the meaning to be conveyed to the user upon reproduction of the multimedia output;

receives user data from the client device over the communication network, the user data collected from the user of the multimedia application, and the user data including information regarding a personal taste of the user;

determines at least one multimedia output depending on the request and the user data by matching a collection of multimedia data to the meaning indicated in the request and by matching the collection of multimedia data to the user data, the matching being based on meta-data of the collection of multimedia data; and transmits the at least one multimedia output to the client device over the communication network, wherein the multimedia output produces a sound or an image or both, and the at least one multimedia output includes meta-data identifying the meaning associated therewith.

2. The content providing apparatus of claim 1, wherein the request depends on a situation, a state or an event occurring in the multimedia application.

3. The content providing apparatus of claim 1, wherein the meaning is negative or positive.

4. The content providing apparatus of claim 1, wherein the meaning is selected from a group including success, failure, gain, loss, danger and security.

5. The content providing apparatus of claim 1, wherein the meaning is selected from a group including calm, dramatic, relaxed, excited, happy, depressed, proud, timid and expectant.

6. The content providing apparatus of claim 1, wherein the meaning is selected from a group including joy, sorrow, tear and hate.

7. The content providing apparatus of claim 1, wherein the multimedia output comprises at least one of audio data and video data to convey the meaning to the user.

8. The content providing apparatus of claim 1, wherein the multimedia output is determined by matching the meta-data thereof to the request.

9. The content providing apparatus of claim 1, wherein the multimedia output is determined by matching the meta-data thereof to the personal taste of the user.

10. The content providing apparatus of claim 1, wherein at least a part of the meta-data are comprised within the multimedia collection.

11. The content providing apparatus of claim 1, wherein at least a part of the meta-data are requested and received from a remote server.

12. A client device connected to a content providing apparatus over a communication network, the client device comprising:

a storage configured to store user data collected from a user of a multimedia application of the client device, said user data including information regarding a personal taste of the user; and a data processor configured to execute the multimedia application, said multimedia application comprising at least one module configured to:

send a request for at least one multimedia output to the content providing apparatus over the communication network, the request being for multimedia output indicating a meaning corresponding to an event occurring within said multimedia application of the client device, said multimedia application being executed by the user and including a gaming application, the event being a result occurring in the execution by the user of said multimedia application, the result including at least one of a high or low score, win or loss, and failure or success, and the meaning to be conveyed to the user upon reproduction of the multimedia output, send the user data to the content providing apparatus over the communication network, and receive the at least one multimedia output from the content providing apparatus over the communication network, wherein the at least one multimedia output is determined in accordance with the request and the user data by matching a collection of multimedia data to the meaning indicated in the request and by matching the collection of multimedia data to the user data, the matching being based on meta-data of the collection of multimedia, the multimedia output produces a sound or an image or both, and the at least one multimedia output includes meta-data identifying the meaning associated therewith.

13. A non-transitory computer readable medium comprising computer program instructions that, when executed by a content providing apparatus including circuitry for personalizing a multimedia application of a client device, the content providing apparatus connected to the client device over a communication network, cause the circuitry to:

receive a request for multimedia output from the client device over the communication network, the request being for multimedia output indicating a meaning corresponding to an event occurring within the multimedia application of the client device, the multimedia application being executed by a user of the client device and including a gaming application, the event being a result occurring in the execution by the user of the multimedia application, the result including at least one of a high or low score, win or loss, and failure or success, and the meaning to be conveyed to the user upon reproduction of the multimedia output;

receive user data from the client device over the communication network, the user data collected from the user of the multimedia application, and the user data including information regarding a personal taste of the user;

determine at least one multimedia output depending on the request and the user data by matching a collection of multimedia data to the meaning indicated in the request and by matching the collection of multimedia data to the user data, the matching being based on meta-data of the collection of multimedia data; and transmit the at least one multimedia output to the client device over the communication network, wherein the multimedia output produces a sound or an image or both, and the at least one multimedia output includes meta-data identifying the meaning associated therewith.

* * * * *